United States Patent
Bayer et al.

(10) Patent No.: US 11,613,294 B2
(45) Date of Patent: Mar. 28, 2023

(54) STEERING COLUMN FOR A MOTOR VEHICLE

(71) Applicants: thyssenkrupp Presta AG, Eschen (LI); thyssenkrupp AG, Essen (DE)

(72) Inventors: Tim Bayer, Lüchingen (CH); Daniel Kreutz, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/252,930

(22) PCT Filed: Jun. 28, 2019

(86) PCT No.: PCT/EP2019/067278
§ 371 (c)(1),
(2) Date: Dec. 16, 2020

(87) PCT Pub. No.: WO2020/007723
PCT Pub. Date: Jan. 9, 2020

(65) Prior Publication Data
US 2021/0197882 A1    Jul. 1, 2021

(30) Foreign Application Priority Data
Jul. 4, 2018 (DE) ..................... 10 2018 211 041.7

(51) Int. Cl.
*B62D 1/181* (2006.01)
*B62D 1/183* (2006.01)
*B62D 1/185* (2006.01)

(52) U.S. Cl.
CPC ............. *B62D 1/181* (2013.01); *B62D 1/183* (2013.01); *B62D 1/185* (2013.01)

(58) Field of Classification Search
CPC .......... B62D 1/181; B62D 1/183; B62D 1/185
See application file for complete search history.

(56) References Cited

U.S. PATENT DOCUMENTS 3,791,223 A * 2/1974 Treichel ................. B62D 1/185
74/493
4,805,478 A   2/1989 Beauch
(Continued)

FOREIGN PATENT DOCUMENTS

CN 102602448 A 7/2012
CN 203005509 U 6/2013
(Continued)

OTHER PUBLICATIONS

English Translation of International Search Report issued in PCT/EP2019/067278, dated Oct. 3, 2019.

*Primary Examiner* — Drew J Brown
(74) *Attorney, Agent, or Firm* — thyssenkrupp North America, LLC

(57) ABSTRACT

A steering column for a motor vehicle, comprising a casing unit, in which a steering spindle is mounted rotatably about a longitudinal axis and which has at least two casing tubes which are guided adjustably relative to one another by an adjustment distance in the direction of the longitudinal axis. In order to permit easier adjustment, the casing tubes can be brought along the adjustment distance relative to one another into at least one comfort region and at least one transition region, wherein a transition adjustment force for the relative adjustment of the casing tubes in the transition region is smaller than a comfort adjustment force for the relative adjustment of the casing tubes in the comfort region.

16 Claims, 8 Drawing Sheets

(56) References Cited

U.S. PATENT DOCUMENTS

| | | | |
|---|---|---|---|
| 8,403,364 B2* | 3/2013 | Monteil | B62D 1/184 |
| | | | 280/775 |
| 2005/0199087 A1* | 9/2005 | Li | B62D 1/184 |
| | | | 74/493 |
| 2013/0074639 A1 | 3/2013 | Toyoda et al. | |
| 2014/0352481 A1 | 12/2014 | Uesaka | |
| 2017/0261028 A1 | 9/2017 | Wilkes | |
| 2018/0251147 A1 | 9/2018 | Heitz | |
| 2019/0031224 A1 | 1/2019 | Huber | |
| 2020/0331513 A1 | 10/2020 | Bayer | |

FOREIGN PATENT DOCUMENTS

| | | | | |
|---|---|---|---|---|
| CN | 107207034 A | 9/2017 | | |
| DE | 10 2015 216 326 A | 6/2016 | | |
| DE | 10 2016 202 465 A | 8/2017 | | |
| DE | 10 2017 221 004 A | 5/2019 | | |
| DE | 102017220769 A1 * | 6/2019 | ............. | B62D 1/183 |
| EP | 2 808 225 A | 12/2014 | | |
| JP | 2016-160988 A | 9/2016 | | |
| WO | 2017/140526 A | 8/2017 | | |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2019/067278, filed Jun. 28, 2019, which claims priority to German Patent Application No. DE 10 2018 211 041.7, filed Jul. 4, 2018, the entire contents of both of which are incorporated herein by reference.

FIELD

The present disclosure generally relates to a steering column for a motor vehicle.

BACKGROUND

A steering column for a motor vehicle has a steering shaft with a steering spindle, to the end of which that is at the rear in the direction of travel and faces the driver a steering wheel is attached for introducing a steering command from the driver. The steering spindle is mounted rotatably in a casing unit, together with which the steering spindle forms an adjusting unit. The casing unit is held by a supporting unit, which is fastened to the vehicle body. Adjustable steering columns permit the setting of the steering wheel position relative to the vehicle body by adjustment of the casing unit relative to the supporting unit.

It is known to design the steering column to be adjustable in the longitudinal direction, i.e. in the axial direction of the steering spindle or in the direction of the longitudinal axis, in order, in the manual driving mode, to adapt the steering wheel in an operating position to the driver's position for a comfortable manual steering intervention, and, in the autonomous driving mode, when no manual steering intervention takes place, to push together the steering column longitudinally in order to bring the steering wheel into a storage position outside the operating position such that the vehicle interior is freed for some other use.

For the longitudinal adjustment, a telescopic arrangement of casing tubes is known, as is described for example in EP 2 808 225 A1. Said arrangement comprises an outer casing tube, which is supported on the vehicle body at the front in the direction of travel and into which an inner casing tube enters telescopically in the axial direction. For the longitudinal adjustment, a motorized adjustment drive is provided, which, as a spindle drive effective in the axial direction, acts on the casing tubes. The steering column can be adjusted by means of the adjustment drive from the storage position, in which the casing tubes are retracted into one another as far as possible in the axial direction, into a driver-side end position, in which the casing tubes are extended out of one another as far as possible. The maximum possible adjustment region between storage position and end position defines the adjustment distance of the steering column.

In the manual driving mode, the steering column is set such that the steering wheel is in an operating region in an individual operating position. The operating region refers to the adjustment region of the operating positions which can be set in an ergonomically expedient manner in the manual driving mode for the input of steering commands. The operating region is also referred to as a comfort region.

Steering columns for an autonomous driving mode have a large adjustment distance, and therefore the storage position is at a significant distance from the operating region, which extends from the maximally extended, driver-side end position only over a partial region of the adjustment distance.

In order to ensure a high degree of rigidity and a natural frequency of the steering column both in the operating region and in the storage position, it is known in the prior art to guide the telescopic casing tubes into one another with little play as possible. In EP 2 808 225 A1 which has been mentioned, for example, a prestressed linear sliding mounting is proposed. A high degree of rigidity can thereby be realized over the entire adjustment distance. However, the prestressing also causes high friction forces which have to be overcome by the adjustment drive during adjustment over the entire adjustment distance. In order in an acceptable time to overcome the relatively large adjustment or transition distance between storage position and operating region during the change between an autonomous and a manual driving mode, an adjustment drive having a relatively large driving power is therefore required, said adjustment drive being heavy, requiring a high amount of energy and a complicated activation.

DE 10 2015 216326 A1 describes a multiple telescopic having at least one additionally inserted intermediate casing tube. A linear rolling bearing having roller bodies that are provided so as to be rollable between the casing tubes in the longitudinal direction is proposed therein. In order to ensure the required high rigidity, a powerful adjustment drive is likewise required, however, in order to overcome the friction.

Thus, a need exists for a steering column having a large adjustment distance, which is adjustable more simply.

DETAILED DESCRIPTION

Figure 1:
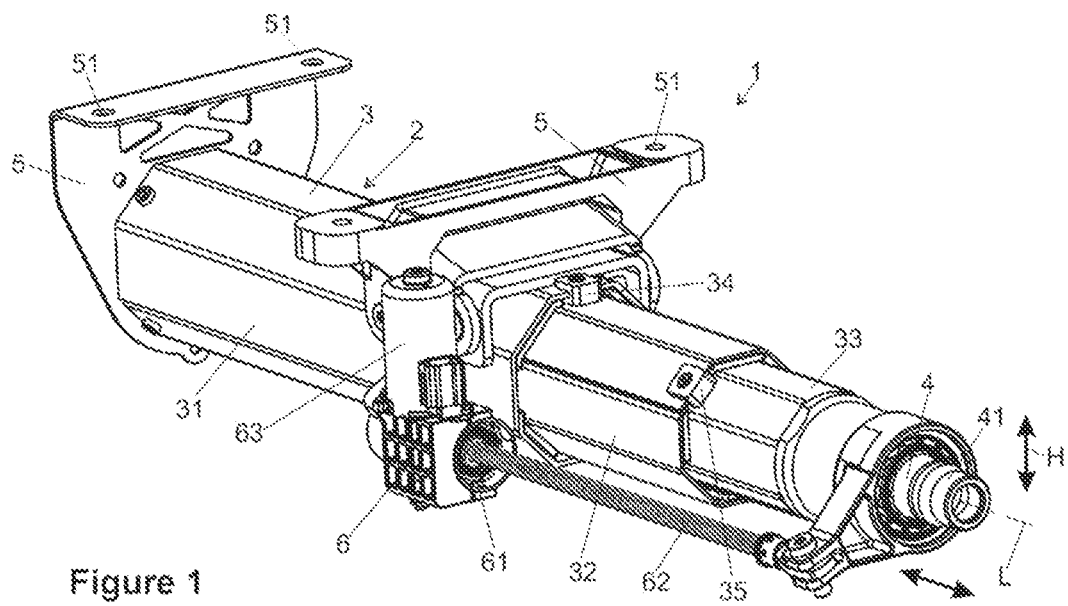
FIG. 1 is a schematic perspective view of a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, comprising a casing unit, in which a steering spindle is mounted rotatably about a longitudinal axis and which has at least two casing tubes which are guided adjustably relative to one another by an adjustment distance in the direction of the longitudinal axis.

According to the invention, in the case of a steering column for a motor vehicle, comprising a casing unit, in which a steering spindle is mounted rotatably about a longitudinal axis and which has at least two casing tubes guided adjustably relative to one another by an adjustment distance in the direction of the longitudinal axis (axial direction), wherein the casing tubes are adjustable relative to one another, it is proposed that the casing tubes can be brought along the adjustment distance relative to one another into at least one comfort region and at least one transition region, wherein a transition adjustment force for the relative adjustment of the casing tubes in the transition region is smaller than a comfort adjustment force for the relative adjustment of the casing tubes in the comfort region.

The casing tubes are preferably arranged telescopically and guided in one another such that they can be retracted and extended telescopically in order to adjust the length of the steering column.

The adjustment distance specifies the maximum telescopic distance, namely the maximum adjustment region in the direction of the longitudinal axis (longitudinal direction), by which the steering column can be retracted and extended by means of the motorized adjustment drive. In the case of steering columns for autonomous driving, the adjustment distance extends from the state retracted maximally forward in the storage position as far as the maximally extended state in the driver-side, rear end position.

In a preferred development, a motorized adjustment drive is provided, which is coupled to the casing tubes in order to adjust the casing tubes relative to one another. The casing tubes can thus be adjusted with respect to one another in a motorized manner. The adjustment drive can comprise, for example, a spindle drive, in which a spindle nut and a threaded spindle screwed therein are rotationally drivable relative to one another in a motorized manner, as a result of which a relative movement is brought about in the axial direction of the threaded spindle. The spindle nut and the threaded spindle act on the casing tubes, as a result of which the latter are movable axially relative to one another.

In contrast to the prior art, in which the adjustment force which is exerted by the adjustment drive and has to be applied for the relative telescopic movement of the casing tubes is identical over the entire possible adjustment distance, the invention proposes that through the configuration of the telescopic arrangement within the adjustment distance subsections are formed, in which the adjustment force required for the adjustment is reduced. Specifically, a differentiation is made between at least one comfort region, also referred to as comfort adjustment position region, and at least one transition region, also referred to as transition adjustment position region. Possible relative adjustment states of the casing tubes are correspondingly defined by the comfort region and transition region. A comfort region defines a region of possible adjustment positions that can be set at least temporarily statically as functional operational positions during operation. In said operational positions, a high degree of rigidity and natural frequency of the steering column is required, for example in an operating position in the operating region, or in the storage position. A transition region defines an adjustment region which lies outside the comfort region or the comfort regions and which has to be passed through within the adjustment distance in order to adjust the steering column into a comfort region. In the transition region, there is no defined operational position; a relative movement of the casing tubes for retraction or extension merely takes place. Within the comfort region or the comfort regions, the casing tubes can be guided in one another with low tolerances, little play or no play, and therefore high rigidity and natural frequency are ensured, as a result of which a relatively higher adjustment force is required, which is referred to as the comfort adjustment force. This can move within the size of the adjustment force required in the prior art over the entire adjustment distance. In the transition region, the requirements in respect of rigidity and natural frequency are lower, and the telescopic guide can be configured according to the invention to be smoother running, for example by means of greater play or reduced friction forces between the casing tubes. As a result, in the case of a steering column according to the invention, the adjustment force in the transition region, said adjustment force being referred to as the transition adjustment force, is smaller than the comfort adjustment force.

The transition adjustment force and the comfort adjustment force are preferably unchangeable during the adjustment operation. In other words, there are preferably no means increasing or changing the adjustment force, with which the comfort adjustment force and/or the transition adjustment force can be adapted during the adjustment operation.

In the event of a manual adjustment, i.e. in an embodiment in which a motorized adjustment drive is not provided, the setting can be undertaken precisely by means of the vehicle driver owing to the higher comfort adjustment force in the comfort region, since sensitive setting of the desired position is possible by the comfort adjustment force which, according to the invention, is increased in relation to the transition adjustment force.

A particular advantage is that an adjustment drive having a given driving power in the smooth-running transition region makes it possible to realize a relatively high adjustment speed which is higher than in a comfort region. The steering column can thereby be adjusted between the storage position and an operating position more rapidly and with a lower consumption of energy. This is particularly advantageous for steering columns having a long adjustment distance, as are used in autonomous driving and in which the comfort regions, which are preferably located in the region of the storage position and in the operating region, extend in the axial direction over a relatively small partial region of the adjustment distance. The resultant relatively long transition region can be correspondingly rapidly passed through, thus enabling a rapid change between an autonomous and a manual driving mode.

The axial direction or the longitudinal direction should be understood as meaning the direction of the longitudinal axis, with the terms being used synonymously.

In the comfort region, for example in the operating region of the steering column, as a rule only relatively small adjustments are required, for example for precisely setting an individual steering wheel position, and therefore the adjustment can take place there at a lower adjustment speed without disadvantage.

In order to achieve a predetermined average adjustment speed over the adjustment distance, use can be made of an adjustment drive that is of smaller dimensions in comparison to the prior art. The weight and the required construction space, the energy consumption and the control complexity can thereby be reduced.

Preferably, at least one first comfort region can be formed in the region where the casing tubes are maximally retracted into one another, and at least one second comfort region can be formed in the region where the casing tubes are maximally extended out of one another, wherein at least one transition region is formed between the first and second comfort region. Located in the first comfort region is the storage position, in which the steering column is held in the autonomous driving mode in a manner which is as secure, low-play and low-vibration as possible. The second comfort region extends over the operating region where the exerted steering and transverse torques have to be reliably supported by the casing unit and a correspondingly high rigidity is required for the connection of the casing tubes. The transition region is dynamically passed through only briefly during the adjustment between the storage position and operating position, with the requirements regarding rigidity and resonance frequency being lower than in the storage and operating positions.

It can be provided that a greater play between the casing tubes is formed in a transition region than in a comfort region. The radial play between the casing tubes determines the friction force during a telescopic adjustment that has to be overcome by the adjustment drive. In the comfort region, a low-play or play-free linear fit can be realized between the casing tubes, said linear fit ensuring high rigidity. In the transition region, the linear fit can have greater play, as a result of which the friction force acting in the axial direction during a telescopic adjustment is reduced.

Alternatively, it is conceivable and possible for the surfaces which are moved relative to one another during the telescopic adjustment and are directed toward one another to be configured differently in the transition region and comfort region such that different friction forces are produced, for example by means of different surface structures, materials, local elastic deformations or the like.

One embodiment of the invention can make provision for an outer casing tube (external casing tube) to have an inner bearing portion, which extends in the axial direction over part of the adjustment distance, and an inner guide portion, which extends in the axial direction over part of the adjustment distance and has a larger internal cross section than the inner bearing portion, and an inner casing tube (internal casing tube) which is accommodated in the outer casing tube has an outer bearing portion, which extends in the axial direction over part of the adjustment distance, and an outer guide portion, which extends in the axial direction over part of the adjustment distance and has a smaller external cross section than the outer bearing portion, wherein the outer bearing portion can be positioned in the inner bearing portion.

In the function as an outer casing tube or external casing tube, an inner casing tube or internal casing tube is accommodated in the internal cross section so as to be displaceable telescopically in the axial direction. Accordingly, a double telescopic merely in each case has an external and an internal casing tube, and, in the case of a multiple telescopic, an intermediate casing tube inserted therebetween acts in each case simultaneously as the external and internal casing tube.

If an external and an internal casing tube are moved telescopically relative to one another by retraction or extension, the inner and outer bearing and guide portions are moved relative to one another in the axial direction and are brought into the coaxial arrangement depending on the relative adjustment state of the casing tubes. Two states can basically occur here, one of which defines the comfort region, in which the outer bearing portion is at least partially located in the inner bearing portion, and the other the transition region, in which the outer and inner bearing portion are at a distance in the axial direction, i.e. the bearing portions of the one casing tube are located in the region of the guide portions of the respective other casing tube.

In respect of shape and dimensions, the outer and inner bearing portion are adapted to one another in such a manner that they form a low-play or play-free linear fit in the axial direction, wherein the bearing play transverse with respect to the longitudinal axis is correspondingly low. In the resulting comfort region, a linear bearing having a rigidity and natural frequency of the casing tube arrangement is produced, where the required adjustment force introduced previously as the comfort adjustment force is correspondingly high.

If the casing tubes are moved out of the comfort region by means of relative adjustment such that the bearing portions are separated from one another in the axial direction, the internal casing tube is located with its outer bearing portion in the inner guide portion of the external casing tube and with its outer guide portion in the inner bearing portion of the external casing tube. As a result, the casing tubes come into a transition region in which they are guided linearly for the longitudinal adjustment, wherein, between the bearing and guide portions arranged coaxially with respect to one another, there is greater play, namely what is referred to as guide play, than in the comfort region between the bearing portions. The required adjustment force in the transition region, said adjustment force being referred to as the transition adjustment force, is thereby lower than the comfort adjustment force.

By means of the changing design of bearing and guide portions in the axial direction, the casing tube arrangement is automatically brought into a comfort or transition region, depending on the respective adjustment state, during an adjustment along the adjustment distance. The outer casing tube of a telescopic arrangement merely has inner bearing and guide portions, the innermost casing tube of a telescopic arrangement merely has outer bearing and guide portions, and an intermediate casing tube inserted in between in a multiple telescopic has inner and outer bearing and guide portions.

Preferably, a casing tube, in its two end portions, in each case has an inner and/or outer bearing portion, between which an inner and/or outer guide portion extends. By means of this arrangement, comfort regions are realized in the end regions when the casing tubes are maximally retracted or extended. This configuration corresponds to the previously explained requirements regarding a steering column for autonomous driving, in which, in the storage position, the casing tubes are maximally retracted into one another, and the operating region is located in the end region of the maximum extension. In the storage position, the bearing portions of both end regions are arranged coaxially in one another. In the operating region, the front bearing portion, with respect to the direction of travel, of the driver-side, rear casing tube together with the rear bearing portion of the front, vehicle-side casing tube is in the low-play bearing engagement of the comfort region. One advantage of this embodiment is that the comfort and transition regions are taken up automatically mechanically in the region of the storage position and the operating region by adjustment of the steering column by means of the adjustment drive.

It can be provided that a bearing element protruding into the cross section between the casing tubes is formed on a casing tube. A bearing element can be attached in the internal cross section of a casing tube and can have a smaller internal cross section than the casing tube, as a result of which it forms an inner bearing portion. If a bearing element which has a larger external cross section than the casing tube is attached on the outside of the casing tube, it can form an outer bearing portion. As explained previously, a comfort region can be set by the fact that the bearing portions formed by the bearing elements are brought to coincide in the axial direction, and a transition region by the axial distance between the bearing elements.

The bearing element can have a sliding element, preferably a sliding sleeve, which is fixedly connected in the axial direction to a casing tube. A sliding sleeve which is continuous in cross section over the circumference, or else one or more sliding elements which are distributed in the form of segments over the circumference can be attached as an outer sliding sleeve on the outside of an internal casing tube or an inner sliding sleeve on the inside in an external casing tube in order to form a bearing portion. Inner and outer sliding sleeves corresponding to one another are adapted to one another such that an inner sliding sleeve can slide with little play or no play in the axial direction in an outer sliding sleeve. A sliding sleeve can be in the shape of a tubular portion and can be adapted to the cross section of the casing tubes, which can have a round, non-round or polygonal, for example square, hexagonal or octagonal cross section. Alternatively, the sliding sleeve which is preferably formed from a plastic can also be sprayed directly onto the corresponding casing tube, for example by plastics injection molding.

The sliding elements can be configured in a friction-reducing manner, for example by means of a sliding coating of the surface, or by being formed from a readily slidable material, such as plastics, for example PTFE (polytetrafluorethylene), or a non-ferrous metal or bearing metal. A telescopic mounting which is adjustable relatively easily despite a small amount of play can thereby be realized in the comfort region by means of the sliding elements. Outside the comfort region, in a guide portion with respect to the internal and external casing surfaces of the casing tubes, the sliding elements have a radial guide play which is greater than the bearing play between the sliding elements in the comfort region.

It can be provided that the bearing element has at least one rolling body, which is mounted in a casing tube so as to be rotatable about a rolling axis. In a bearing portion, a rolling body, preferably a plurality of rolling bodies, for example rollers, needle rollers or the like, can be mounted in a casing tube so as to be rotatable in each case about a rolling axis which lies transversely with respect to the longitudinal axis and is fixed in the axial direction relative to the casing tube. The rolling body protrudes from the one casing tube radially inward or outward, and is dimensioned in such a manner that it can be rolled on another casing tube in the axial direction on the outside or on the inside in the axial direction. For example, outwardly protruding rollers can be mounted in the outer bearing portion of an internal casing tube, which rollers can roll in the comfort region with little play or no play on the inside in a bearing portion of an external casing tube, and which rollers can be moved along in the transition region in a play-containing manner by means of a cross-sectionally larger guide region of the external casing tube. A linear roller bearing is thereby formed, which produces high rigidity in the comfort region and is movable in a smooth-running manner through the transition region.

The rolling bodies are preferably arranged in one or more axially parallel first rows. The rows can be arranged on a casing tube in a manner distributed, preferably distributed uniformly, in the circumferential direction. If three or more casing tubes are arranged inside one another in a multiple telescopic arrangement, it is advantageous if the rolling bodies are arranged at a spacing, in a manner offset with respect to one another in the circumferential direction, between coaxially adjacent casing tubes.

It is possible for the steering spindle to be coupled to a feedback actuator. A feedback actuator serves in a steer-by-wire steering system that is not coupled mechanically to provide the driver via the steering wheel with haptic feedback depending on the driving situation, in order to impart a steering sensation similar to that in conventional, mechanically coupled steering systems. For this purpose, a feedback actuator has an actuator unit which comprises an adjustment drive serving as a manual torque adjuster or steering wheel adjuster, and which, depending on the feedback signal, couples a restoring torque (feedback torque) corresponding to the actual reaction torque into the steering wheel via the steering shaft. Such "force-feedback" systems provide the driver with the impression of an actual driving situation as in the case of a conventional steering system, which facilitates an intuitive reaction.

In the event of a manual adjustment of the casing tubes with respect to one another, a fixing device can be provided which can be switched over between a release position, in which the casing tubes are adjustable with respect to one another, and a fixing position, in which the casing tubes are locked with respect to one another. In an advantageous development, this fixing device can comprise an operating lever which is connected to a first stroke-generating disk, which interacts with a second stroke-generating disk and is rotatable in relation to said second stroke-generating disk by means of the operating lever in order to provide a clamping stroke, as a result of which the casing tubes can be set with respect to one another (fixing position). The fixing device can therefore be switched over between the release position and the fixing position by means of the operating lever, by rotation of the operating lever.

Alternatively, a motorized adjustment drive is provided, which is coupled to the casing tubes so as to adjust the casing tubes relative to one another.

The motorized adjustment drive is connected to the internal casing tube and to the external casing tube and can be used to retract and extend the internal casing tube in the axial direction relative to the external casing tube. The adjustment drive can comprise a spindle drive, with a spindle nut arranged on a threaded spindle, and with a drive motor, by which the threaded spindle and the spindle nut can be driven in a rotating manner relative to one another. Adjustment drives of this type are known in principle in the prior art and are considered to be reliable and robust. In this case, the spindle nut is attached to the one casing tube, the internal or external casing tube, so as to be non-displaceable in the direction of the longitudinal axis, and the threaded spindle is attached to the other casing tube, the external or internal casing tube, which is telescopic with respect thereto. The spindle nut or the threaded spindle is driven in a rotating manner by an electric actuating motor via a suitable mechanism, for example a worm or belt mechanism, as a result of which the threaded spindle or spindle nut which is fixed with respect to rotation relative thereto is moved in a translatory manner in the direction of the spindle longitudinal axis, and, depending on the relative direction of rotation, the internal casing tube retracts or extends in the axial direction relative to the external casing tube.

The casing tube together with the steering spindle mounted therein forms an adjusting unit. The adjusting unit can be held in a supporting unit, which can be connected to a vehicle body. It can be provided here that the adjusting unit is mounted on the supporting unit such that it can be pivoted in terms of height about a pivot axis lying transversely with respect to the longitudinal axis. As a result of the pivoting about such a horizontal pivot axis, a height adjustment can be realized, in which the steering wheel which is attached to the rear end of the steering spindle can be set in height relative to the driver position.

The height adjustment can be performed manually. Particularly for the automated stowage of the steering column during autonomous driving, it is advantage for an electric height adjustment drive to be connected to the supporting unit and to the adjusting unit, by means of which height adjustment drive the adjusting unit is movable relative to the supporting unit about the pivot axis. The height adjustment drive is likewise known per se and can be realized, for example, in the form of an electromotively driven spindle drive, as described previously for the longitudinal adjustment.

FIG. 1 shows a view, obliquely from the rear with respect to the direction of travel, of a steering column 1 according to the invention which has an adjusting unit 2. The adjusting unit 2 comprises a casing unit 3, which has an external casing tube 31, an intermediate casing tube 32 and an internal casing tube 33. The casing tubes 31, 32 and 33 are arranged coaxially in one another such that they can be displaced telescopically in the axial direction of a longitudinal axis L, as indicated by a double arrow.

A steering spindle 4 which, at its rear end, has a connection portion 41 for attaching a steering wheel (not illustrated) is mounted in the casing unit 3 so as to be rotatable about the longitudinal axis L.

The casing unit 3 is held in a two-part supporting unit 5, which has fastening means 51 for attaching to a vehicle body (not illustrated).

An adjustment drive 6 has a spindle drive with a spindle nut 61 and a threaded spindle 62 screwed therein, which spindle nut and threaded spindle can be driven in a rotating manner relative to one another by an electric motor 63. The threaded spindle 62 extends parallel to the longitudinal axis L and is connected to the internal casing tube 33, and the spindle nut 61 is supported via the adjustment drive 6 in the longitudinal direction, which corresponds to the axial direction of the longitudinal axis L, on the external casing tube 31, wherein the external casing tube 31 has a fork portion, and wherein the adjustment drive 6 is connected to the fork portion with the interconnection of a damping rubber element 666, which is in the form of a silent bushing. As a result of a relative rotation by means of the motor 63, the threaded spindle 62 and the spindle nut 61 are moved together or apart from one another, depending on the direction of rotation, as a result of which the internal casing tube 33 is retracted or extended in the axial direction into or out of the external casing tube 31, as indicated by the double arrow. This results in a longitudinal adjustment, by means of which a steering wheel which is attached to the connection portion 41 can be brought forward into a storage position in which the internal casing tube 33 and the intermediate casing tube 32 are retracted in the external casing tube 31, i.e. are recessed toward the front, or into an operating position in the operating region, in which the casing tubes 31, 32, 33 are extended out of one another.

As an alternative, the spindle nut 61 can be supported on the internal casing tube 33, and the threaded spindle 62 can be supported on the external casing tube 31.

Figure 2:
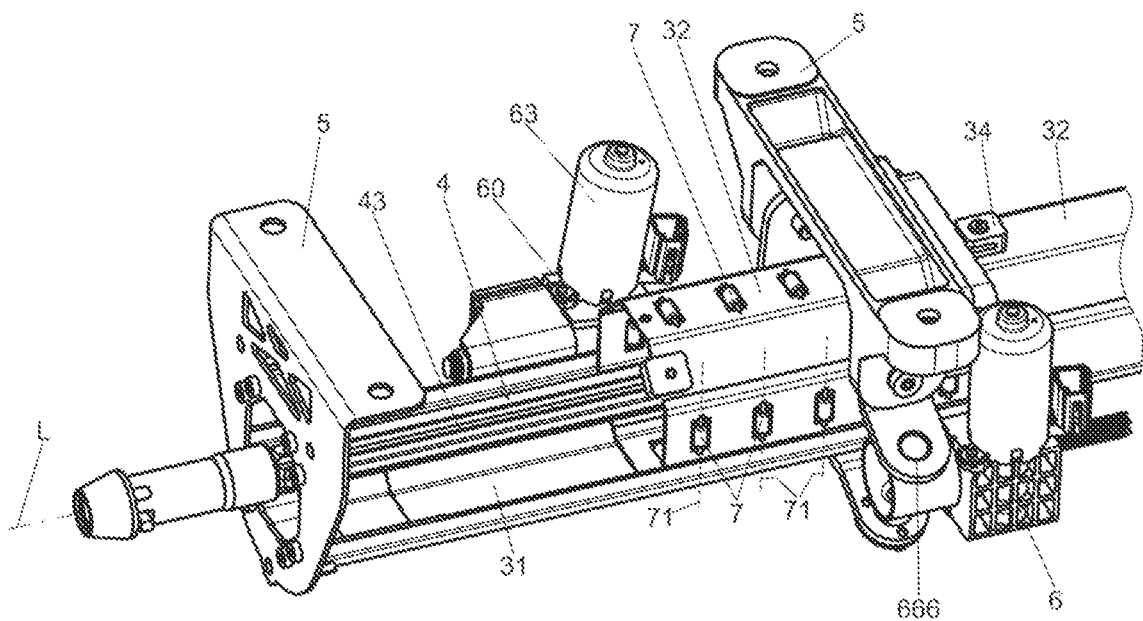
FIG. 2 is a schematic partially open interior view of the steering column according to FIG. 1.
Figure 3:
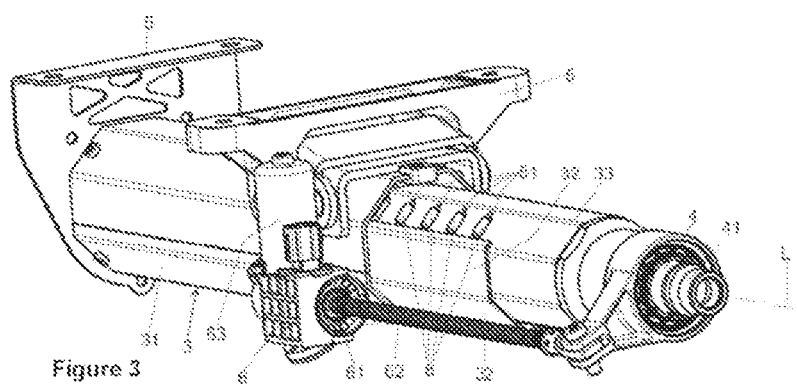
FIG. 3 is a further schematic, partially open interior view of the steering column according to FIG. 1.
Figure 4:
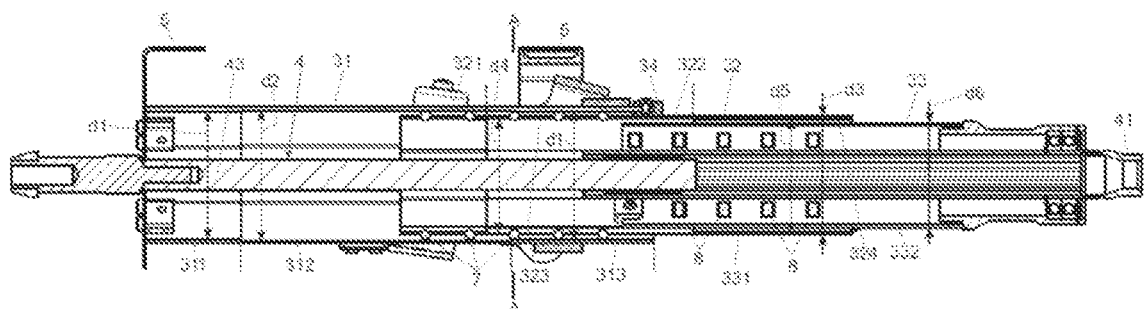
FIG. 4 is a longitudinal section through the steering column according to FIG. 1.
Figure 5:
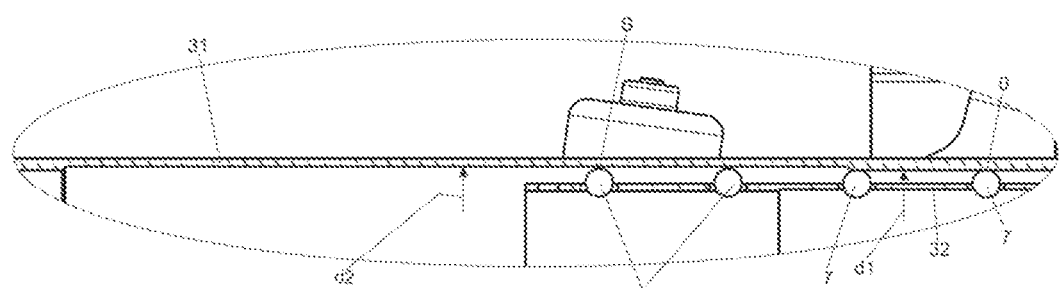
FIG. 5 is an enlarged detail view of FIG. 4.
Figure 6:
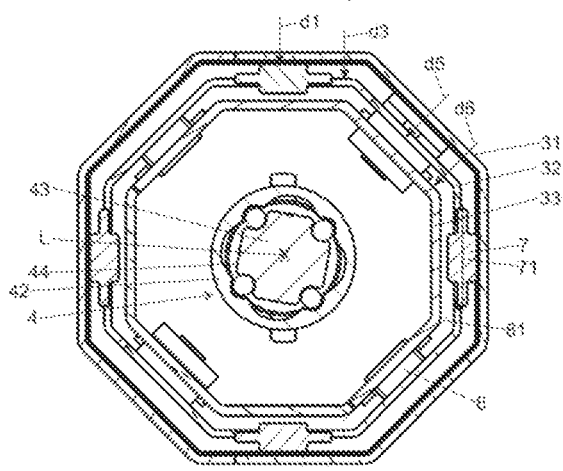
FIG. 6 is a cross section A-A through the steering column according to FIG. 4.
Figure 7:
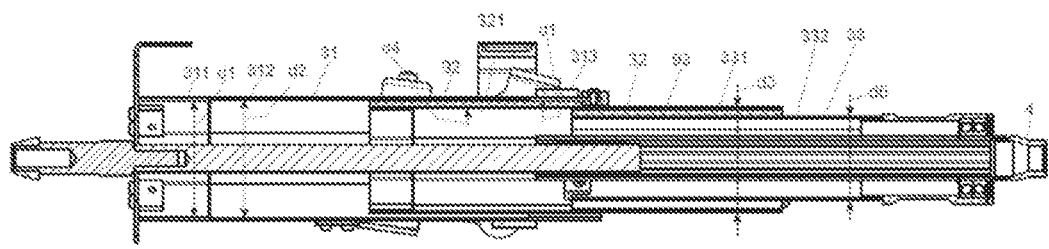
FIG. 7 is a longitudinal section through a second embodiment of a steering column.

In FIG. 2, in a perspective view from the front, the external casing tube 31 has been cut open and partially omitted such that the view onto the intermediate casing tube 32 is opened up. FIG. 3 illustrates the intermediate casing tube 32 cut open in a view similar to FIG. 1. FIG. 4 shows a longitudinal section along the longitudinal axis L, and FIG. 5 shows a detail view thereof. FIG. 6 shows a cross section A-A according to FIG. 4.

The casing tubes 31, 32 and 33 have an octagonal profile cross section, as can be seen in FIG. 6 which shows a cross section A-A according to FIG. 4 through the casing unit 3 in a partially extended state, in which the internal casing tube 33 and the intermediate casing tube 32 are partially retracted into the external casing tube 31. It can be gathered from this that the first rollers 7 are arranged between the external casing tube 31 and the intermediate casing tube 32, and the second rollers 8 are arranged between the intermediate casing tube 32 and the internal casing tube 33. The rollers 7 and 8 are mounted here so as to be rotatable about their roller axes 71 and 81, which lie transversely with respect to the longitudinal axis L, at the casing tubes 32 and 33. The rollers 7 protrude radially outward from the external cross section of the intermediate casing tube 32 such that they can roll in the axial direction on the inner side of the external casing tube 31, and, analogously, the rollers 8 protrude radially from the external cross section of the internal casing tube 33 such that they can roll in the axial direction on the inner side of the intermediate casing tube 32. The rollers 7 and 8 are in each case arranged in rows of in each case 5 rollers 7, 8 in the axial direction on every second side of the octagonal profile of the casing tubes 32, 33 at an angular offset α of 360°/8=45°, the rollers being arranged offset at a spacing in the circumferential direction between the intermediate casing tube 32 and the internal casing tube 33, as can clearly be seen in the cross section shown in FIG. 6.

The external casing tube 31 has, in the region of its front, body-side end, a first inner bearing portion 311 with an internal width d1, which is adjoined rearward in the axial direction by a guide portion 312 having a greater internal width d2, i.e.: d1<d2, which is adjoined rearward in the axial direction by a second inner bearing portion 313 having the internal width d1 of the first bearing portion 311. The respective internal width is the inner distance between two parallel opposite flat portions of the octagonal profile cross section, wherein the rollers 7 roll on said flat portions. If the intention is to use casing tubes 31, 32, 33 having circular-cylindrical cross sections, the internal width of the respective portion is identical to the internal diameter of the respective portion.

Over the axial region of the total of in each case five rollers 7, an outer bearing portion 321 is formed on the intermediate casing tube 32, said outer bearing portion having an external width d1, which is measured on the outside over the protruding rollers 7 and which is thus identical to the internal width d1 of the inner bearing portions 311 and 313. The rollers 7 can thereby roll without play in the bearing portions 311 and 313. The outer bearing portion 321 is adjoined rearward in the axial direction by an outer guide portion 322 having a smaller external width d3, wherein d3<d1.

In the front end region, the intermediate casing tube 32 has an inner guide portion 323 having an internal width d4, which is adjoined rearward in the axial direction by an inner bearing portion 324 having a smaller internal width d5, i.e.: d4>d5.

In a similar manner to the intermediate casing tube 32, the internal casing tube 33 has an outer bearing portion 331, which is formed by the row of a total of five rollers 8 and has an external width d5, which is measured over the outwardly protruding rollers 8 and which therefore corresponds to the internal width d5 of the inner bearing portion 324 of the intermediate casing tube 32 such that the rollers 8 can roll without play. The outer bearing portion 331 is adjoined rearward in the axial direction by an outer guide portion 332 having a smaller external width d6, i.e. wherein d6<d5.

The rollers 7 of the outer bearing portion 321 can roll in the axial direction on the inside in the inner bearing portions 311 and 313 without play, where play=0, during the adjustment of the casing tubes 31 and 32. As a result, the telescopic connection is supported without play and with high rigidity, and, within the context of the invention, an adjustment is undertaken in the comfort region. If the casing tubes 31 and 32 are moved relative to one another in the longitudinal direction for the retraction or extension, the rollers 7 in the guide region 312 have radial play S in the size of the difference (d2−d1) with respect to the inner side of the external casing tube 31. This is illustrated in enlarged form in the detail illustration of FIG. 5.

Analogously thereto, the internal casing tube 33 is mounted in the intermediate casing tube 32: the rollers 8 of the outer bearing portion 331 can roll in the axial direction on the inside in the inner bearing portion 324 without play, where play=0, during the relative adjustment of the casing tubes 32 and 33. The telescopic connection is thereby supported without play and with high rigidity, and, within the context of the invention, an adjustment is undertaken in the comfort region. If the casing tubes 32 and 33 are moved relative to one another in the longitudinal direction for the retraction or extension, the rollers 8 in the guide portion 323 have radial play S in the size of the difference (d4−d5) with respect to the inner side of the intermediate casing tube 32. This is indicated in enlarged form in the detail illustration of FIG. 5 by the reference signs placed between parentheses.

The overall adjustment distance of the steering column 1 corresponds to the sum of the adjustments in the comfort regions and in the transition region. The greater play S means that, for the adjustment in the axial direction in the transition region, a smaller friction force has to be overcome than in the comfort regions in the operating region and in the region of the storage position. A stop 34 is attached to the external casing tube 31 at the rear end, said stop protruding at the open end inwards into the intermediate space between the external casing tube 31 and the intermediate casing tube 32. During the extension, the intermediate casing tube 32 strikes with its rollers 7 in the outer bearing portion in the axial direction against the stop 34, and is secured against separating from the external casing tube 31. A stop 35 which protrudes inward into the intermediate space between the intermediate casing tube 32 and the internal casing tube 33 is attached at the rear end of the intermediate casing tube 32, said stop securing the internal casing tube 33 from being pulled out of the intermediate casing tube 32 by the rollers 7 striking against the stop in the axial direction.

The steering spindle 4 is likewise formed telescopically, with an internal shaft 43 which engages in a form-fitting manner in an external shaft 42 and is telescopic in the longitudinal direction, wherein a guide sleeve 44 for forming a smooth-running sliding guide is inserted in between. Alternatively, a linear roller bearing guide can be provided between the internal shaft 43 and the external shaft 42.

FIGS. 7 to 12 illustrate a further embodiment of the invention that has tubular sliding sleeves 92 and 93 instead of the rollers 7, 8. In order to form an outer bearing portion 321, the sliding sleeve 92 is fastened at the rear on the intermediate casing tube 32, wherein the sliding sleeve has an external width of substantially d1, and its length in the axial direction corresponds approximately to the length of the row formed by the five rollers 7 on the intermediate casing tube 32 in the first embodiment. In a corresponding manner, in order to form an outer bearing portion 331, the further sliding sleeve 93 is fastened at the rear to the internal casing tube 33, wherein said sliding sleeve has an external diameter of approximately d5, and its length in the axial direction corresponds to the length of the row formed by the five rollers 7 on the intermediate casing tube 32 in the first embodiment.

Figure 8:
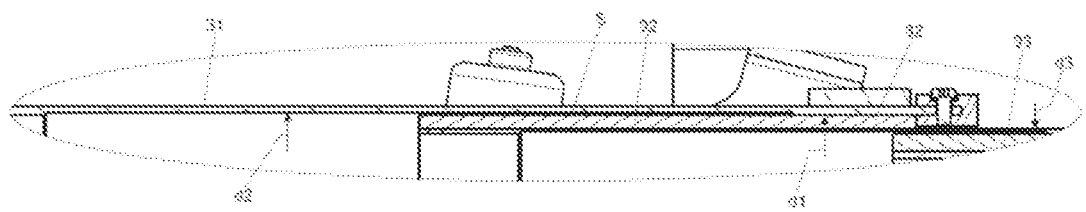
FIG. 8 is an enlarged detail view of FIG. 7.

In the enlarged detail illustration of FIG. 8, which corresponds in terms of content to FIG. 5 of the first embodiment, the arrangement of the sliding sleeve 92 can be seen, wherein the arrangement between the casing tubes 32 and 33 is analogous.

Figure 9:
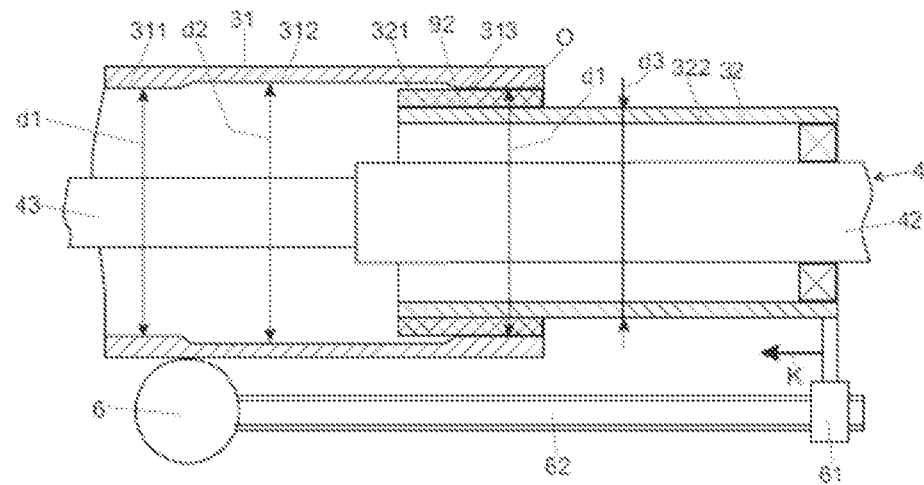
FIG. 9 is a schematic detail view of FIG. 7 of the steering column in a first comfort region in the operating region.

FIG. 9 shows schematically a steering column with circular-cylindrical casing tubes 31, 32 in a comfort region in the extended state, which corresponds to the operating region. The sliding sleeve 92 is mounted as an outer bearing portion 321 having the external diameter d1, in the form of an external width, in the inner bearing portion 311 of the external casing tube 31 with little or no play. By means of the adjustment drive 6, a relative adjustment can take place in the axial direction in order to precisely set a steering wheel position wherein the to be applied for this purpose.

Figure 10:
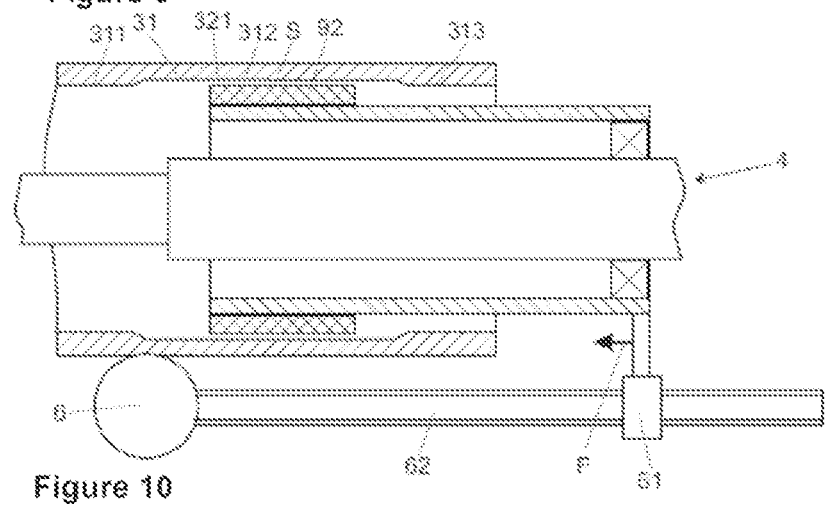
FIG. 10 is a schematic detail view of FIG. 7 of the steering column in a transition region.

FIG. 10 shows the steering column in a transition region, in which the casing tube 32 is retracted forward out of the operating region, to the left in the drawing. The sliding sleeve 92 and therefore the outer bearing portion 321 is at a distance in the axial direction from the inner bearing portion 313 and is located in the inner guide portion 312 where there is play S=(d2−d1) with respect to the internal wall of the external casing tube 31. For the retraction, because of the friction force which is reduced by the play S, all that is required is a transition adjustment force F which is smaller than the comfort adjustment force K, as is indicated by the force arrow. F<K.

Figure 11:
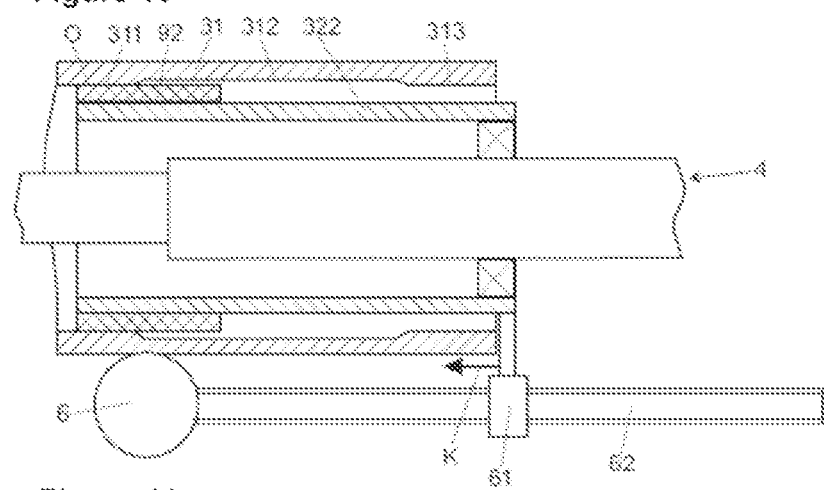
FIG. 11 is a schematic detail view of FIG. 7 of the steering column in a first comfort region in a storage position.

As soon as the sliding sleeve 93, during further retraction out of the guide portion 312, enters from the guide portion 312 into the inner bearing portion 311, as shown in FIG. 11, the comfort region of the storage position is reached. A low-play mounting as in the bearing portion 313 again takes place there. Owing to the fact that the bearing portions 311 and 313 in the example have the same internal diameter d1, the comfort adjustment force K is again required there for the adjustment. It is also conceivable and possible for the inner bearing portion 311 to have a smaller or larger internal diameter in order to predetermine the comfort adjustment force K to be larger or smaller there.

Figure 12:
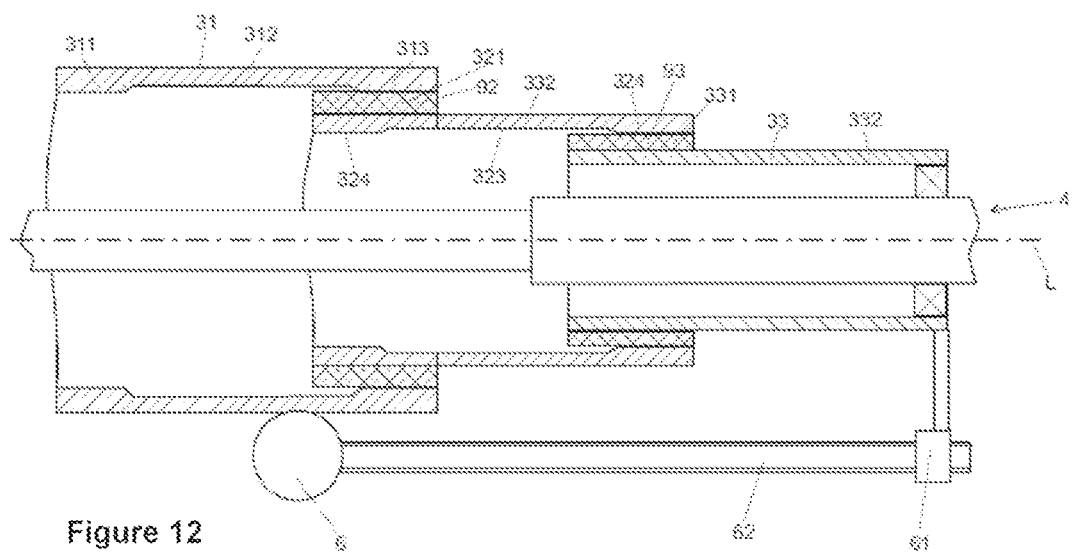
FIG. 12 is a schematic sectional view of the steering column according to FIG. 7.

FIG. 12 shows schematically a multiple telescopic arrangement with the casing tubes 31, 32 and 33 and the sliding sleeves 92 and 93, which interact in accordance with FIGS. 9 to 11.

The entire adjustment distance of the steering column 1 comprises the adjustment positions in the comfort regions according to FIGS. 9 and 11 and in the transition region according to FIG. 10 that can be passed through or set during the complete retraction and extension. By means of the greater play S, for the adjustment in the axial direction in the transition region, a smaller friction force has to be overcome than in the comfort regions in the operating region and in the region of the storage position.

Figure 13:
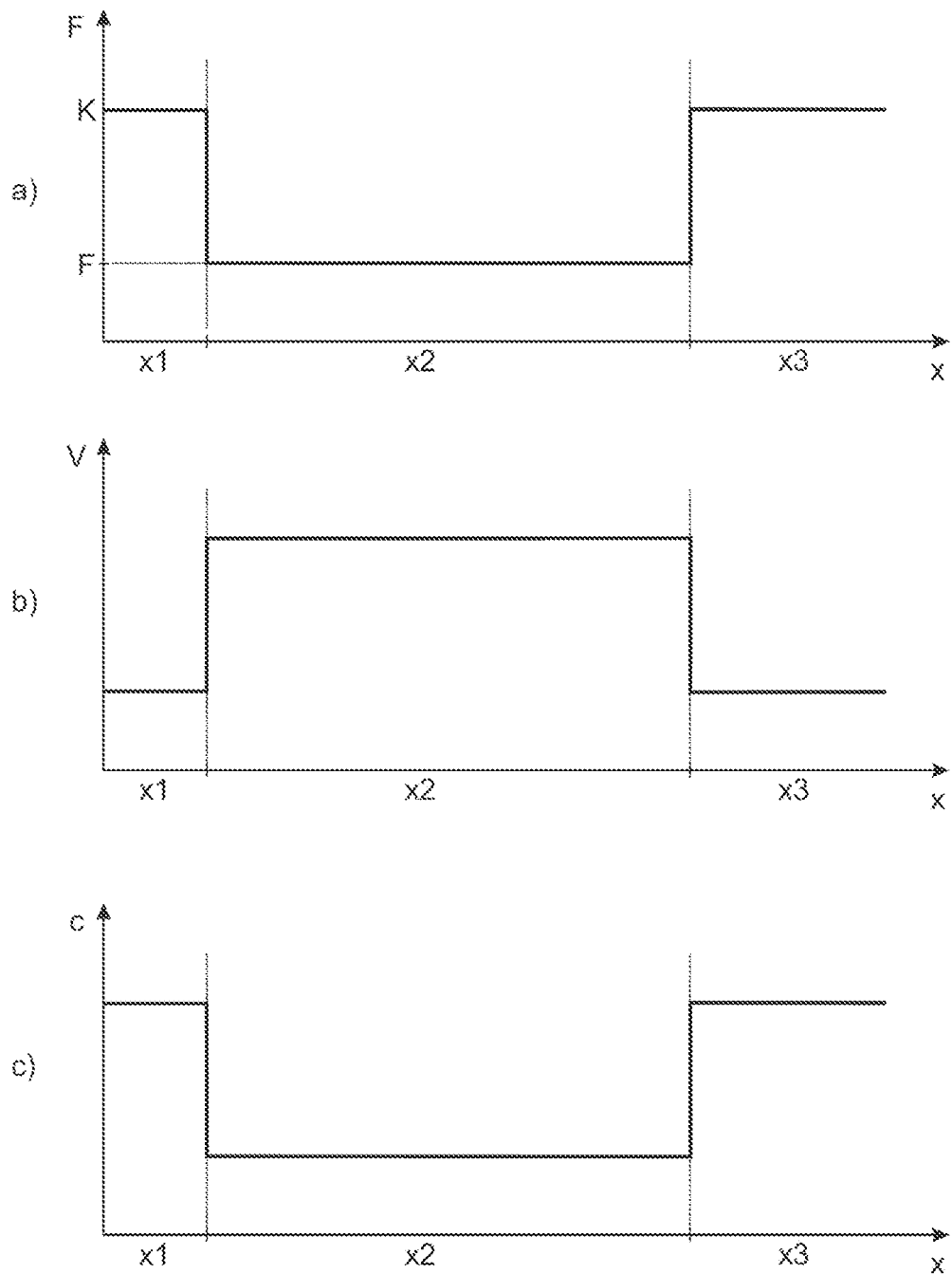
FIG. 13a is a diagram of an adjustment force and travel, speed and travel and friction force and travel, of a steering column.
FIG. 13b is a diagram of an adjustment force and travel, speed and travel and friction force and travel, of a steering column.
FIG. 13c is a diagram of an adjustment force and travel, speed and travel and friction force and travel, of a steering column.

FIG. 13 shows a diagram in which a) illustrates the adjustment force F, b) illustrates the adjustment speed v and c) illustrates the friction force, in each case over the adjustment distance x. Here, x3 corresponds to the adjustment in the comfort region of the operating region in the adjustment state shown in FIG. 11, x2 corresponds to the adjustment in the transition region in the adjustment state shown in FIG. 10, and x1 corresponds to the adjustment in the comfort region of the storage position in the adjustment state shown in FIG. 9.

It can clearly be seen in FIG. 13.a) how the required transition adjustment force F drops from the comfort adjustment force K to the lower transition adjustment force F during the adjustment between the comfort regions. As a consequence, a higher adjustment speed can be realized by means of an adjustment drive 6 having a given driving power in the transition region, as illustrated in FIG. 13.b). The friction force c which is illustrated in FIG. 13.c) and is to be overcome for the adjustment behaves analogously to the adjustment force. The radial and vertical rigidity of the steering column behaves analogously to the friction force illustrated in FIG. 13.c).

By means of a second adjustment drive 60, which can be in the form of a spindle drive similar to the adjustment drive 6, and which acts on the adjusting unit 2 and the supporting unit 5, the casing unit 3 can be adjusted in the height direction H.

Figure 14:
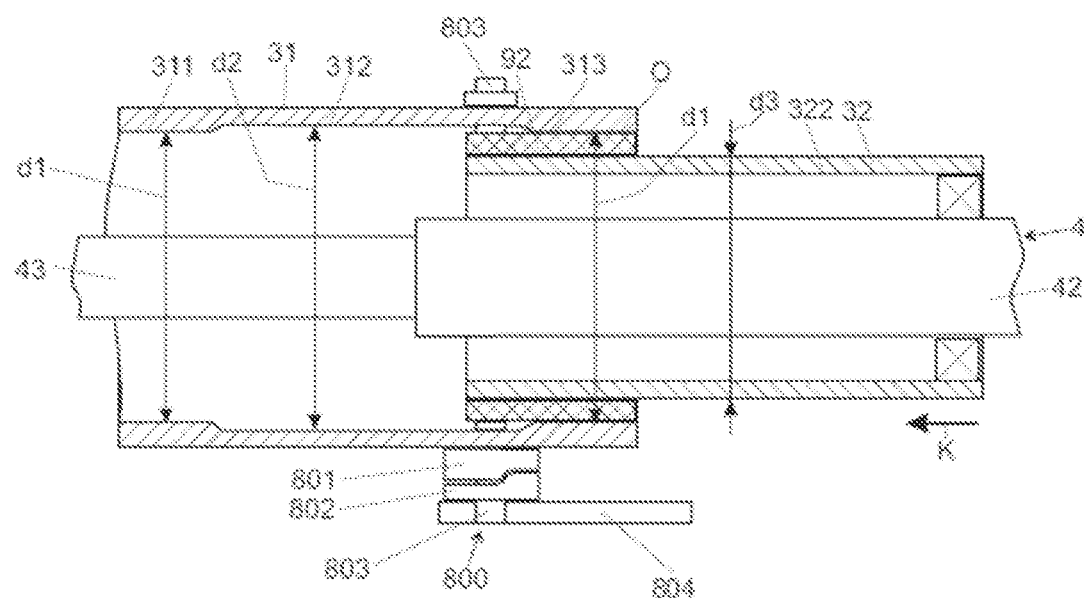
FIG. 14 is a schematic detail view of a manually adjustable steering column in a first comfort region in the operating region.

FIG. 14 shows schematically a steering column having circular-cylindrical casing tubes 31, 32 in an extended state in a comfort region which corresponds to the operating region. The steering column is in the form of a manually adjustable steering column and has a fixing device 800 which can be switched over between a release position, in which the casing tubes 31, 32 are adjustable relative to one another, and as is illustrated in FIG. 14, and a fixing position, in which the casing tubes are locked with respect to one another. The fixing device 800 has an operating lever 804 which is connected for conjoint rotation to a cam disk 802, which is designed as a first stroke-generating disk, interacts with a slotted disk 801, which is designed as a second stroke-generating disk, and is rotatable in relation to said slotted disk by means of the operating lever 804 in order to provide a clamping stroke in the direction of the axis of the clamping bolt 803, as a result of which the casing tubes 31, 32 are fixed with respect to one another (fixing position).

The fixing device 800 can thus be switched over by means of the operating lever 804, by rotation of the operating lever 804, between the release position, as illustrated in FIG. 14, and the fixing position. The sliding sleeve 92 is mounted as an outer bearing portion 321 having the external diameter d1, which is in the form of an external width, in the inner bearing portion 311 of the external casing tube 31 with little play or no play. By means of the adjustment drive 6, a relative adjustment can be undertaken in the axial direction in order to precisely set a steering wheel position, wherein the the comfort adjustment force K is to be applied for this purpose.

In a variant embodiment which is not illustrated, the fixing device 800 can have tilting pins or roller bodies between the stroke-generating disks.

LIST OF REFERENCE SIGNS

1 Steering column
2 Adjusting unit
3 Casing unit
31 External casing tube
311,313 inner bearing portions of 31
312 inner guide portion of 31
32 Intermediate casing tube
321 outer bearing portion of 32
322 outer guide portion of 32
323 inner guide portion of 32
324 inner bearing portion of 32
33 Internal casing tube
331 outer bearing portion of 33
332 outer guide portion of 33
34, 35 Stop
4 Steering spindle
41 Connection portion
42 External shaft
43 Internal shaft
44 Guide sleeve
5 Supporting unit
51 Fastening means
6, 60 Adjustment drive
61 Spindle nut
62 Threaded spindle
63 Motor
7, 8 Rollers
71,81 Roller axes
92, 93 Sliding sleeves
d1 Internal diameter of 311/external diameter of 321
d2 Internal diameter of 312
d3 External diameter of 322
d4 Internal diameter of 323
d5 Internal diameter of 324/External diameter of 331
d6 External diameter of 332
L Longitudinal axis
S Play
K Comfort adjustment force
F Transition adjustment force
V adjustment speed
C Friction force

What is claimed is:
1. A steering column for a motor vehicle, comprising:
a steering spindle, and
a casing unit in which the steering spindle is mounted rotatably about a longitudinal axis, the casing unit comprising two casing tubes which are guided adjustably relative to one another by an adjustment distance in the direction of the longitudinal axis, wherein the casing tubes are configured to be brought along the adjustment distance relative to one another into a comfort region and a transition region, wherein a transition adjustment force for the relative adjustment of the casing tubes in the transition region is smaller than a comfort adjustment force for the relative adjustment of the casing tubes in the comfort region, wherein an outer casing tube of the casing tubes has an inner bearing portion that extends in the direction of the longitudinal axis over a part of the adjustment distance, and an inner guide portion, which extends in the direction of the longitudinal axis over a part of the adjustment distance and has a greater internal cross section than the inner bearing portion, wherein an inner casing tube of the casing tubes that is received in the outer casing tube has an outer bearing portion that extends in the direction of the longitudinal axis over a part of the adjustment distance, and an outer guide portion that extends in the direction of the longitudinal axis over a part of the adjustment distance and has a smaller external cross section than the outer bearing portion, wherein the outer bearing portion is configured to be positioned in the inner bearing portion.

2. The steering column of claim 1 wherein a first comfort region is formed in a region where the casing tubes are maximally retracted into one another, and a second comfort region is formed in a region where the casing tubes are maximally extended out of one another, wherein the transition region is located between the first and second comfort region.

3. The steering column of claim 1 wherein a greater play is provided between the casing tubes in the transition region relative to the comfort region.

4. The steering column of claim 1 wherein the inner guide portion extends between an end portion of the outer casing tube and the inner guide portion, wherein the outer guide portion extends between an end portion of the inner casing tube and the outer guide portion.

5. The steering column of claim 1 wherein a bearing element protruding into the cross section between the casing tubes is formed on one of the casing tubes.

6. The steering column of claim 5 wherein the bearing element has a sliding element, which is fixedly connected to the one of the casing tubes in the direction of the longitudinal axis.

7. The steering column of claim 5 wherein the bearing element has at least one rolling body, which is mounted in the one of the casing tubes so as to be rotatable about a rolling axis.

8. The steering column of claim 1 wherein the casing tubes are hollow-cylindrical with a circular-cylindrical or polygonal cross section.

9. The steering column of claim 1 further comprising a motorized adjustment drive, which is coupled to the casing tubes so as to adjust the casing tubes relative to one another.

10. A steering column for a motor vehicle, comprising:
a steering spindle, and
a casing unit in which the steering spindle is mounted rotatably about a longitudinal axis, the casing unit comprising two casing tubes which are guided adjustably relative to one another by an adjustment distance in the direction of the longitudinal axis, wherein the casing tubes are configured to be brought along the adjustment distance relative to one another into a comfort region and a transition region, wherein a transition adjustment force for the relative adjustment of the casing tubes in the transition region is smaller than a comfort adjustment force for the relative adjustment of the casing tubes in the comfort region, wherein a bearing element protruding into the cross section between the casing tubes is formed on one of the casing tubes, wherein the bearing element has at least one rolling body, which is mounted in the one of the casing tubes so as to be rotatable about a rolling axis.

11. The steering column of claim 10 wherein a first comfort region is formed in a region where the casing tubes are maximally retracted into one another, and a second comfort region is formed in a region where the casing tubes are maximally extended out of one another, wherein the transition region is located between the first and second comfort region.

12. The steering column of claim 10 wherein a greater play is provided between the casing tubes in the transition region relative to the comfort region.

13. The steering column of claim 10 wherein each of the casing tubes has two end portions, and an inner and/or outer bearing portion, between which an inner and/or outer guide portion extends.

14. The steering column of claim 10 wherein the bearing element has a sliding element, which is fixedly connected to the one of the casing tubes in the direction of the longitudinal axis.

15. The steering column of claim 10 wherein the casing tubes are hollow-cylindrical with a circular-cylindrical or polygonal cross section.

16. The steering column of claim 10 further comprising a motorized adjustment drive, which is coupled to the casing tubes so as to adjust the casing tubes relative to one another.

* * * * *